US006774592B2

(12) United States Patent
Walters et al.

(10) Patent No.: US 6,774,592 B2
(45) Date of Patent: Aug. 10, 2004

(54) METHOD AND SYSTEM FOR CONTROLLING A PERMANENT MAGNET MACHINE

(75) Inventors: James E. Walters, Carmel, IN (US); John Derek Williams, New Palestine, IN (US)

(73) Assignee: Delphi Technologies, Inc., Troy, MI (US)

( * ) Notice: Subject to any disclaimer, the term of this patent is extended or adjusted under 35 U.S.C. 154(b) by 253 days.

(21) Appl. No.: 10/007,793

(22) Filed: Dec. 3, 2001

(65) Prior Publication Data

US 2003/0102829 A1 Jun. 5, 2003

(51) Int. Cl.[7] .................... H02K 23/00; H02P 7/06
(52) U.S. Cl. .................. 318/254; 318/138; 318/430; 318/431; 318/439; 318/700; 318/720; 318/721; 318/722; 318/723; 318/724
(58) Field of Search .................. 318/138, 254, 318/430, 431, 439, 700, 720, 721, 722, 723, 724

(56) References Cited

U.S. PATENT DOCUMENTS

| | | | | |
|---|---|---|---|---|
| 3,679,954 A | * | 7/1972 | Hedrick | 318/254 |
| 4,629,958 A | * | 12/1986 | Kurakake et al. | 318/723 |
| 4,766,359 A | * | 8/1988 | Smith et al. | 318/652 |
| 5,449,986 A | * | 9/1995 | Dozor | 318/254 |
| 5,493,188 A | * | 2/1996 | Yoshikawa et al. | 318/254 |
| 5,537,020 A | * | 7/1996 | Couture et al. | 318/720 |
| 6,075,332 A | * | 6/2000 | McCann | 318/432 |
| 6,172,498 B1 | * | 1/2001 | Schmidt et al. | 324/207.12 |
| 6,324,845 B1 | | 12/2001 | Fulks et al. | |
| 6,373,211 B1 | * | 4/2002 | Henry et al. | 318/432 |
| 6,404,152 B1 | * | 6/2002 | Kobayashi et al. | 318/254 |
| 6,407,531 B1 | * | 6/2002 | Walters et al. | 318/805 |
| 6,465,975 B1 | | 10/2002 | Naidu | |
| 6,498,447 B2 | * | 12/2002 | Mann et al. | 318/254 |
| 6,498,449 B1 | | 12/2002 | Chen et al. | |
| 6,566,830 B2 | * | 5/2003 | Walters | 318/445 |
| 6,605,912 B1 | | 8/2003 | Bharadwaj et al. | |

* cited by examiner

Primary Examiner—Robert Nappi
Assistant Examiner—Tyrone Smith
(74) Attorney, Agent, or Firm—Jimmy L. Funke

(57) ABSTRACT

Method and system for controlling a permanent magnet machine are provided. The method provides a sensor assembly for sensing rotor sector position relative to a plurality of angular sectors. The method allows starting the machine in a brushless direct current mode of operation using a calculated initial rotor position based on angular sector position information from the sensor assembly. Upon reaching a predefined mode-crossover criterion, the method allows switching to a sinusoidal mode of operation using rotor angle position based on extrapolating angular sector position information from the sensor assembly.

15 Claims, 4 Drawing Sheets

METHOD AND SYSTEM FOR CONTROLLING A PERMANENT MAGNET MACHINE

BACKGROUND OF THE INVENTION

The present invention is generally related to control of electromechanical machines, and, more particularly, the present invention is related to method and system for controlling a permanent magnet (PM) machine without using high resolution absolute rotor position information.

In the starting and control of permanent magnet machines using sinusoidal current control, the absolute position of the rotor of the machine is generally required to appropriately position the stator's current vector relative to the rotor's magnet flux vector in order for the machine to develop a desired level of torque.

It is known that various techniques have been proposed to determine absolute rotor position. Some of the proposed techniques require the use of resolver devices. Although resolver devices can accurately determine the absolute position of the rotor, such devices generally require tight positional tolerances and associated driving circuitry, and thus their relatively high cost incrementally adds to the overall cost of a propulsion system that uses permanent magnet machines.

Other techniques have attempted to determine the absolute position of the rotor without the use of sensors. Unfortunately, sensorless techniques may require computationally intensive algorithms and may not be suitable to applications, such as those using flywheel alternator starter systems, where a relatively high initial torque is desired so that, for example, an internal combustion engine coupled to the starter system can be started as quickly as possible under extreme environmental conditions.

Unfortunately, absolute position sensors based on standard position-pulse techniques have limitations since such sensors may not be effectively utilized for applications that require high initial starting torque since the absolute position is not determined until a pulse indicative of relative position of the rotor is received by a controller. For example, the rotor position determination may not occur for up to about one mechanical revolution of the rotor, during which the controller would be unable to appropriately position the current vector relative to the flux vector. This condition could lead either to reduced torque generation or even to negative torque generation.

In view of the foregoing issues, it is desirable to provide techniques capable of producing high initial starting torque without having to use a high resolution absolute position sensor. It would be further desirable to use a low-cost and reliable sensing scheme that allows a standard vector controller that normally operates in a sinusoidal alternating current (AC) mode of operation to run during start up of the machine in a brushless direct current (BLDC) mode of operation to take advantage of the relatively higher torque characteristics that are achievable during the BLDC mode of operation. It is also desirable to be able to seamlessly transition or crossover from the BLDC mode of operation to the sinusoidal mode of operation once the startup of the machine is achieved. As will be readily understood by those skilled in the art, the use of the expression brushless direct current mode of operation is a bit of a misnomer since the mode is not truly a DC mode, if by DC one means a mode whose machine voltages and currents are unidirectional for a given condition of speed and torque. In fact, the voltages and currents of the machine generally vary trapezoidally in the BLDC mode of operation, however, the expression BLDC as used herein is consistent with traditional and well-understood usage in the field of electrical motors. For readers desiring further background regarding the operation of brushless DC motors, see $4^{th}$ Ed. of textbook titled "Electric motors" by Cyril G. Veinott and Joseph E. Martin at pp. 261–263, published by McGraw-Hill Book Company.

U.S. patent application Ser. No. 09/932,197, assigned to the same assignee of the present invention and herein incorporated by reference, discloses innovative techniques for controlling a permanent magnet machine using a sensor assembly for sensing rotor sector position relative to a plurality of angular sectors and an incremental sensor for sensing angular increments in rotor position. It would be desirable to further improve the control techniques disclosed in the above-identified patent application so that one can achieve the benefits of vector control operation, upon transitioning from the BLDC mode of operation, without having to use any incremental sensor. That is, it would be desirable to provide low-cost and reliable techniques capable of producing high initial starting torque during the BLDC mode of operation, and further capable of accurate vector control, without employing any incremental sensor, upon the machine reaching a predefined mode-crossover criterion, such as reaching a predefined mode-crossover rotor speed, or machine voltage limit corresponding to the predefined mode-crossover criterion.

BRIEF SUMMARY OF THE INVENTION

Generally, the present invention fulfills the foregoing needs by providing in one aspect thereof a method for controlling a permanent magnet machine. The method provides a sensor assembly for sensing rotor sector position relative to a plurality of angular sectors. The method allows starting the machine in a brushless direct current mode of operation using a calculated initial rotor position based on angular sector position information from the sensor assembly. Upon reaching a predefined mode-crossover criterion, the method allows switching to a sinusoidal mode of operation using rotor angle position based on extrapolating angular sector position information from the sensor assembly.

The present invention further fulfills the foregoing needs by providing in another aspect thereof, a system for controlling a permanent magnet machine. The system includes a sensor assembly for sensing rotor sector position relative to a plurality of angular sectors. A rotor angle processor includes an angular sector assigner configured to assign rotor position based on angular sector position information from the sensor assembly, with an initial rotor position being used for starting the machine in a brushless direct current mode of operation. The rotor angle processor further includes an extrapolator configured to determine rotor angle position based on angular sector position information from the sensor assembly. A switching module is responsive to a switching signal from a mode-crossover controller to pass rotor position from the extrapolator. The rotor position information from the extrapolator is used to provide a sinusoidal mode of operation, in lieu of the brushless direct current mode of operation, upon the mode-crossover controller determining whether a predefined mode-crossover criterion has been reached.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
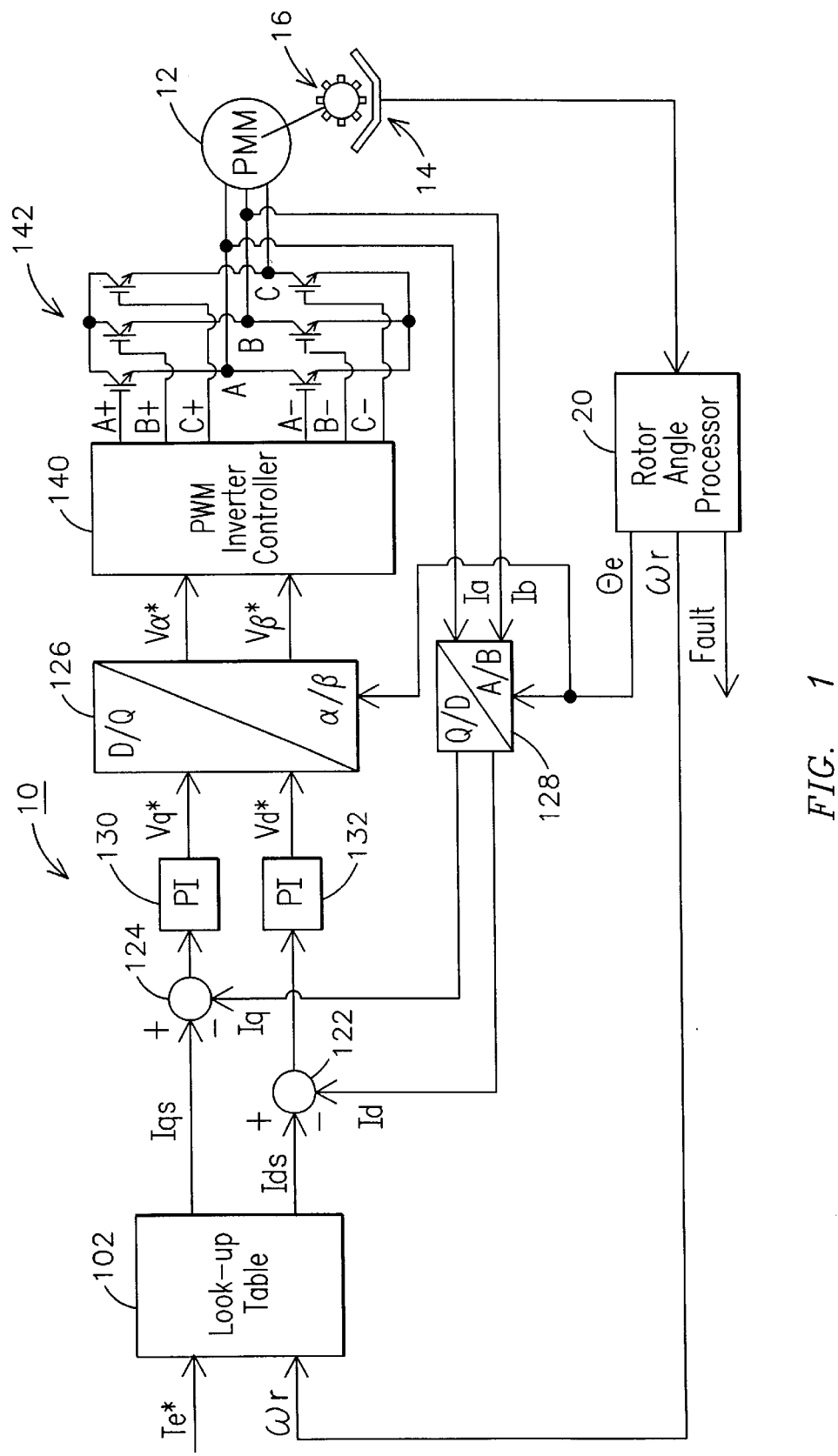
FIG. 1 illustrates a block diagram schematic of an exemplary propulsion system, including a vector controller operable in a BLDC mode or in a sinusoidal mode based on rotor angle information from a rotor angle processor, in accordance with aspects of the present invention.

FIG. 1 shows a block diagram representation of a system 10 embodying aspects of the present invention for controlling a permanent magnet machine (12). As shown in FIG. 1, system 10 includes a sensor assembly 14 for sensing rotor sector position relative to a plurality of angular sectors. In one exemplary embodiment, sensor assembly 14 comprises three sensors circumferentially spaced about 120 electrical degrees from one another. Examples of sensors that may be used for sensing rotor sector position include Hall-effect sensors, magneto-resistive sensors and optical sensors. In one exemplary embodiment, as is well-known for BLDC operation of electrical machines, the three sensors are electromagnetically coupled to a toothed wheel 16 with one tooth per pole pair. Assuming the foregoing circumferential arrangement for the sensors, then one can define a plurality of six angular sectors, each encompassing about 60 electrical degrees. During operation of the machine, the rotor position would be known to a resolution of +/−30 electrical degrees. That is, sensor assembly 14 allows determining the position of the rotor in any respective one of the six angular sectors. Since the machine is being started in a BLDC mode, it is desirable to assign the midpoint angle of the sector. One of the key features of the invention is the fact that a standard vector controller system is used during start up of the machine in a BLDC mode of operation. The inventors of the present invention have recognized that such standard vector controller may be, figuratively speaking, "forced" or "tricked" to operate during start up of the machine in the BLDC mode of operation and, thus, take advantage of the relatively superior starting torque generation afforded by that mode. The inventors of the present invention have further recognized that the transition from the BLDC mode to the sinusoidal mode of operation can be achieved in a seamless manner by the vector controller.

Figure 2:
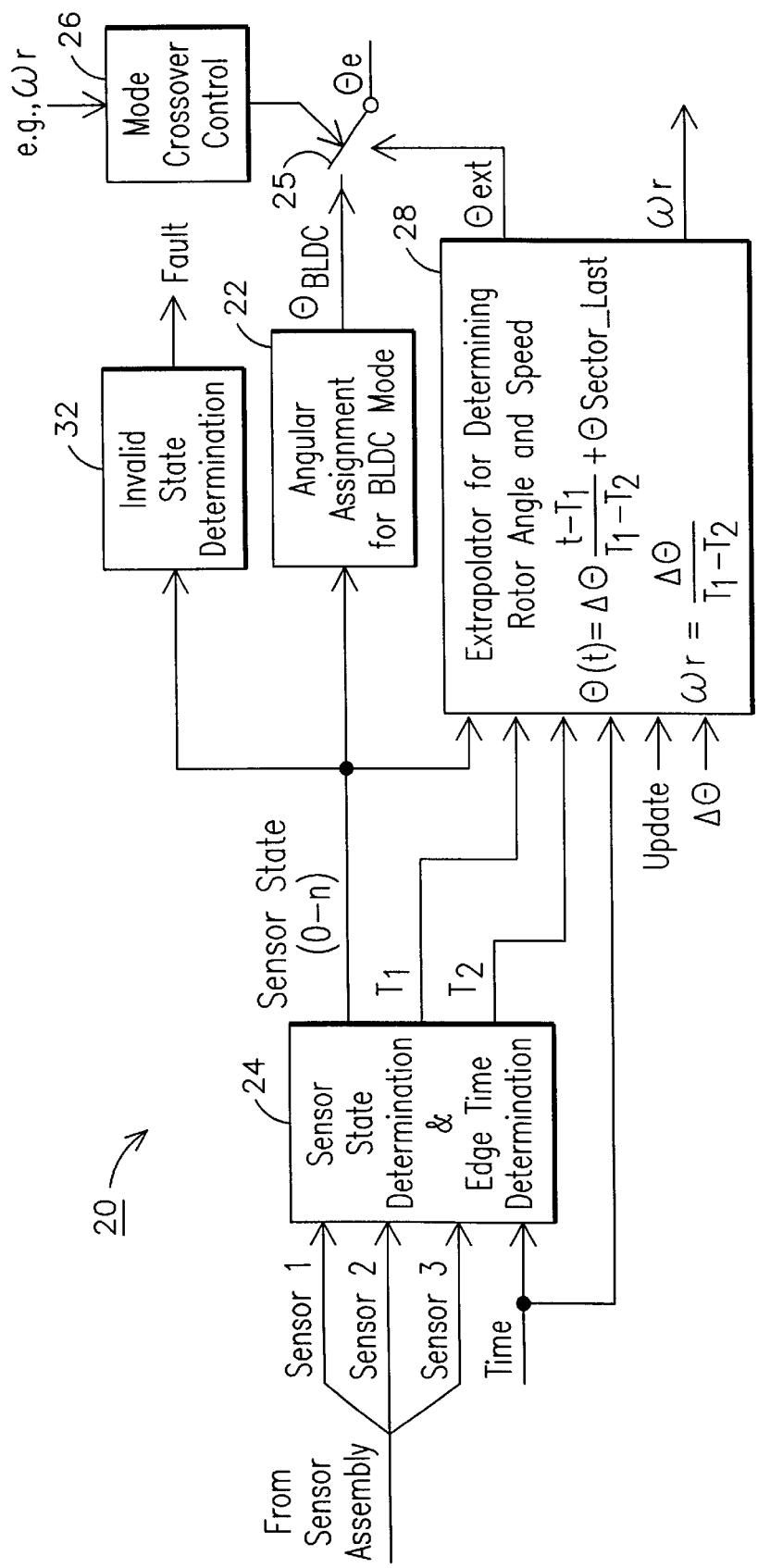
FIG. 2 illustrates further details regarding the rotor angle processor of FIG. 1.

The rotor sector position from sensor assembly 14 is supplied to a rotor angle processor 20 to determine the appropriate rotor position during the BLDC mode and during the sinusoidal mode. As seen in FIG. 2, processor 20 includes an angular sector assigner 22 configured to assign rotor position $\theta_{BLDC}$ during the BLDC mode of operation based on the angular sector position information from sensor assembly 14. The rotor position $\theta_{BLDC}$ is passed through a mode-selector switch 25 to respective voltage and current transformation units 126 and 128 (FIG. 1) for starting the machine in the BLDC mode of operation.

Figure 4:
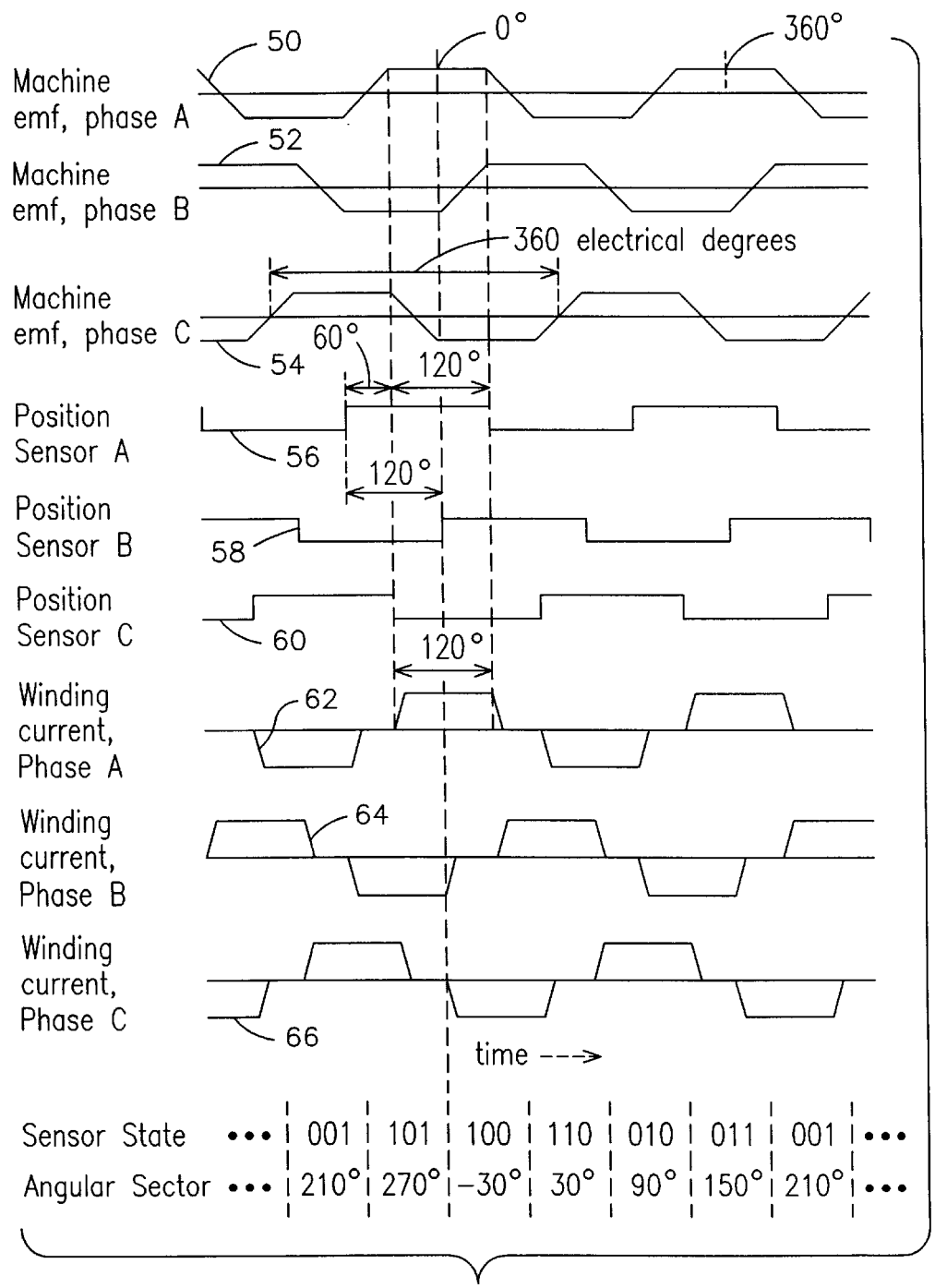
FIG. 4 illustrates exemplary signal plots for each phase of a three phase permanent magnet machine and including exemplary sensor states corresponding to angular rotor information calculated by the rotor angle processor of FIG. 1.

A sensor state determination module 24 is configured to determine the state of each sensor based on the state of the pulses from sensor assembly 14. Module 24 is further configured to determine, as the rotor of the machine rotates, the timing of each sensor state transition indicative of transitions between any two adjacent angular sectors. FIG. 4 in part illustrates exemplary sensor states corresponding to the angular sectors. For example, if the initial rotor position falls in a sector between zero and sixty degrees, then the initial rotor angle assignment in the BLDC mode may correspond to thirty degrees. As the rotor position transitions from that initial angular sector to the next angular sector, e.g., the angular sector between 60 and 120 degrees, then the next rotor angle assignment may correspond to ninety degrees. Upon the machine reaching a predefined mode-crossover criterion, e.g., rotor machine speed, machine voltage limit, elapsed time value, rotor angle travel, etc, as determined by a mode crossover controller 26, the rotor angle position $\theta_{EXT}$ supplied to voltage and current transformation units 126 and 128 would be determined by a rotor angle and speed extrapolator 28 using extrapolation techniques well-understood by those skilled in the art. For example in one exemplary embodiment, the rotor angle extrapolation calculation is based on the following equation:

$$\theta_{EXT}(t) = \theta_{SECTOR\_LAST} + \Delta\theta \frac{t - T_1}{T_1 - T_2},$$

wherein $\theta_{EXT}(t)$ represents the present value for the extrapolated rotor angle, $\theta_{SECTOR\_LAST}$ represents the angle at the last sector transition, $\Delta\theta$ represents the angular resolution provided by the sensor assembly, (e.g., 60 degrees), $T_1$ represents the time at which the last sensor state transition occurred, $T_2$ represents the time at which the previous to the last state transition occurred, and t represents a variable indicative of time, thus the expression $t-T_1$ represents time elapsed from the last state transition. In one exemplary embodiment, the rotor speed $\omega_r$ is computed based on the following equation:

$$\omega_r = \frac{\Delta\theta}{T_1 - T_2}.$$

It will be appreciated that the present invention is not limited to the foregoing extrapolation equations since other extrapolation equations may be used for deriving rotor position information. For example, the extrapolation equation may be based on parameters indicative of rotor acceleration, and may include a suitable digital filter to better accommodate rotor dynamics of any given machine application, and including sensor and target wheel variation. A module 32 processes the various sensor states so that in the event an invalid sensor state or invalid sensor sequence is determined, then a fault indication signal is generated so that appropriate corrective action may be taken.

Figure 3:
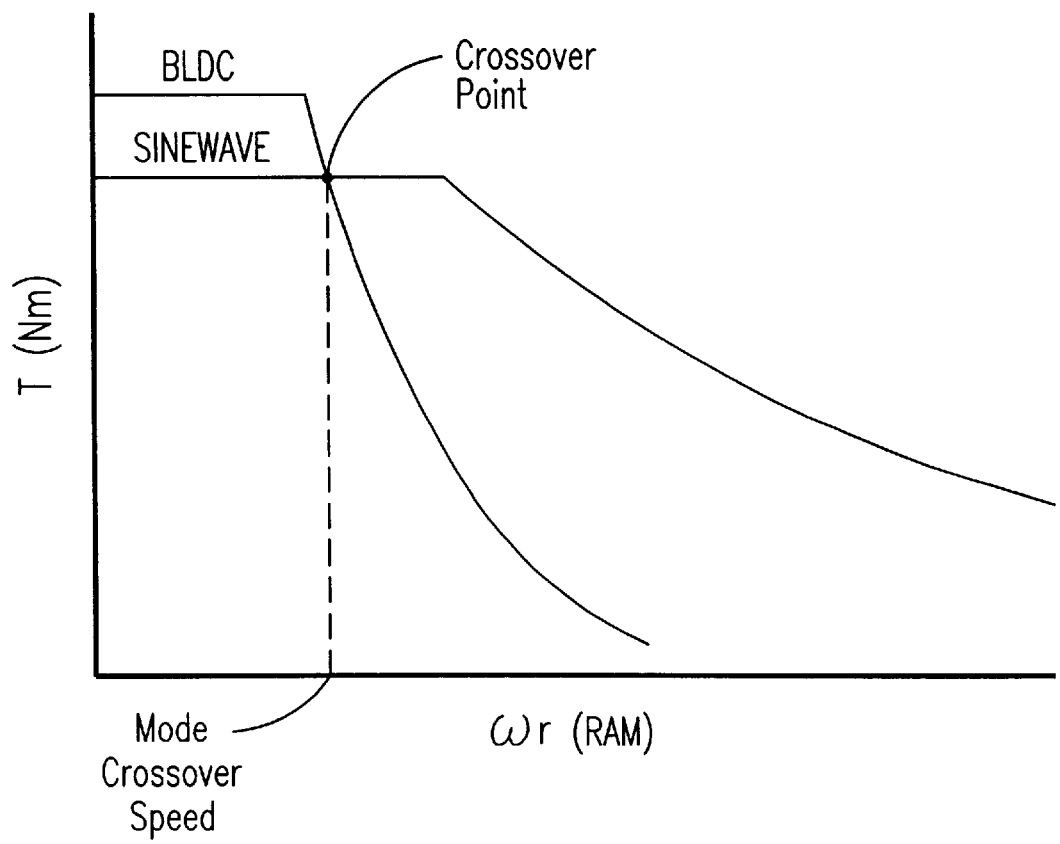
FIG. 3. illustrates respective machine torque-speed plots for the BLDC and the sinusoidal modes of operations including an exemplary crossover point.

The extrapolated rotor position information is used by the voltage and current transformation units 126 and 128 to provide sinusoidal current mode of operation, in lieu of the BLDC mode of operation, upon the mode crossover controller 26 determining that the machine has reached the predefined mode crossover criterion. It will be appreciated by those skilled in the art that one or more parameters may be used to determine whether the machine has reached the mode crossover criterion, for example, rotor speed, machine voltage, elapsed time, rotor angle travel, etc. Each of the above parameters may be chosen as an indicator that the extrapolated rotor angle position has reached a sufficiently high level of accuracy to enable the machine to seamlessly transition from the BLDC mode of operation to the sinusoidal mode of operation. As suggested above, the transition is preferably made at a point that minimizes torque variation by choosing an appropriate crossover point. FIG. 3 illustrates respective machine torque-speed plots for the BLDC and the sinusoidal modes of operations including an exemplary crossover point corresponding to a mode-crossover rotor speed.

As shown in FIG. 1, the direct (d) axis current reference ($I_{ds}$) and the quadrature (q) axis current reference ($I_{qs}$) may be adjusted as a function of commanded torque $T_e{}^*$ and rotor speed $\omega_r$ using analytically and/or experimentally derived values stored in a look-up table 102 that may comprise a two-dimensional look-up table responsive to two respective inputs to supply two outputs. Using techniques well-known to those skilled in the art, look-up table 102 may be configured to provide optimum efficiency control for an ideal case by adjusting the value of the d axis current reference ($I_{ds}$) and the q axis current reference ($I_{qs}$) as a function of commanded torque $T_e{}^*$ and rotor speed $\omega_r$. The value of the torque reference signal $T_e{}^*$ may be externally-derived by a system master controller or may correspond to the torque value commanded by an operator through a suitable machine propulsion throttle handle.

The d axis current reference, ($I_{ds}$) and a feedback current signal Id is each respectively applied to a subtractor 122 to generate a difference output signal. It will be understood that the subtracting operation respectively executed by subtractor 122 and other such devices described below may be executed by a summer having one inverting input terminal and one non-inverting input terminal. It will be further understood that any of the various arithmetic and logical operations performed in system 10 may be conducted through respective software modules as may be executed in a suitable microprocessor and such operations need not be executed through hardware modules. It will be appreciated that the difference output signal from subtractor 122 represents an error signal between the d axis current reference signal (Ids) and the feedback current signal Id. Similarly, the torque-producing current component reference Iqs is processed by a subtractor 124 that receives a feedback current Iq. In this case, the difference output signal from subtractor 124 represents an error signal between the torque current component reference signal Iqs and the feedback current signal Iq.

By way of example and not of limitation, a standard vector controller may comprise components such as respective voltage and current transformation units 126 and 128, and two proportional plus integral (PI) current regulators 130 and 132, each such component using techniques well-understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. Current transformation unit 128 converts the three-phase currents in the stationary frame into equivalent two-phase orthogonal currents in the rotor frame. After the transformation is performed, the two orthogonal current signals $I_q$ and $I_d$ in the rotor frame are respectively applied to the two PI current regulators 130 and 132 as current feedback signals through subtractors 124 and 122. The output signals from the PI current regulators are then provided to voltage transformation unit 126 and are converted into equivalent two-phase voltage references in the stationary frame. Each respective output signal of voltage transformation unit 126 is then applied to a PWM inverter controller 140 that in one exemplary embodiment may comprise an over-modulation space vector PWM unit to generate six respective duty cycle values. It will be appreciated that the controller functionality is analogous to having six synchronous timers for respectively generating six-gate pulse signals to the respective gate drive circuits of an inverter 142 that energizes the phases of the permanent magnet machine 12. It will be further appreciated that the inverter's legs will be appropriately switched on and off according to the voltage levels of the gate signals from the controller in order to control operation of the permanent magnet machine.

FIG. 4 illustrates exemplary electromotive force (EMF) voltage signals for each phase of a three phase permanent magnet machine 12 (FIG. 1). In FIG. 4, the EMF voltage signals are respectively identified by the reference numerals 50, 52 and 54. FIG. 4 further illustrates signals 56, 58 and 60, such as may be generated by the sensor assembly 14 (FIG. 1), each representative of a respective stream of pulses indicative of rotor position relative to each phase of the machine. In one exemplary embodiment, sensor assembly 14 comprises three sensors constructed to form an integrated sensor assembly. See U.S. patent application Ser. No. 09/944,418, assigned to the same assignee of the present invention and herein incorporated by reference, for one example of an integrated sensor assembly using innovative techniques for reducing phasing inaccuracies in the sensing elements. It will be appreciated, however, that the sensor assembly 14 is not limited to three sensors and the spatial positioning of the sensors is not limited to 120 electrical degrees since the techniques of the present invention may be utilized with polyphase machines having more or less than three phases. FIG. 4 further illustrates exemplary phase currents 62, 64 and 66 that are produced by the machine when energized by an inverter circuit 142 (FIG. 1) in response to gating signals derived using combinatorial logic well-known to those skilled in the art for energizing the respective power switches in the inverter 142 based on the sensor state information.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a permanent magnet machine, said method comprising:

providing a sensor assembly for sensing rotor sector position relative to a plurality of angular sectors;

starting the machine in a brushless direct current mode of operation using a calculated initial rotor position based on angular sector position information from the sensor assembly; and upon reaching a predefined mode-crossover criterion, switching to a sinusoidal mode of operation using rotor angle position based on extrapolating angular sector position information from the sensor assembly, wherein the mode-crossover criterion is reached when the extrapolated rotor angle position has a sufficiently high level of accuracy to enable the machine to seamlessly transition from the brushless direct current mode of operation to the sinusoidal mode of operation.

2. The method of claim 1 wherein the extrapolating of angular sector position information comprises:

determining the angular sector corresponding to a respective sensor state;

determining timing of sensor state transitions; and calculating the present value of extrapolated rotor angle.

3. A method for controlling a permanent magnet machine, said method comprising:

providing a sensor assembly for sensing rotor sector position relative to a plurality of angular sectors;

starting the machine in a brushless direct current mode of operation using a calculated initial rotor position based on angular sector position information from the sensor assembly; and upon reaching a predefined mode-crossover criterion, switching to a sinusoidal mode of operation using rotor angle position based on extrapolating angular sector position information from the sensor assembly, wherein a calculating of a present value of extrapolated rotor angle is based on the following equation:

$$\theta_{EXT}(t) = \theta_{SECTOR\_LAST} + \Delta\theta \frac{t - T_1}{T_1 - T_2},$$

wherein $\theta_{EXT}$ (t) represents the present value for the extrapolated rotor angle, $\theta_{SECTOR\_LAST}$ represents the angle at the last sector transition, $\Delta\theta$ represents the angular resolution provided by the sensor assembly, $T_1$ represents the time at which a last sensor state transition occurred, $T_2$ represents the time at which the previous to the last state transition occurred, and t represents a variable indicative of time.

4. The method of claim 1 wherein the sensor assembly comprises three sensors circumferentially spaced about 120 electrical degrees from one another.

5. The method of claim 1 wherein the sensor assembly is selected from the group comprising Hall-effect, magneto-resistive, and optical sensors.

6. The method of claim 4 wherein the three sensors in the sensor assembly comprise an integrated sensor assembly.

7. A system for controlling a permanent magnet machine, said system comprising:

a sensor assembly for sensing rotor sector position relative to a plurality of angular sectors;

a rotor angle processor including an angular sector assigner configured to assign rotor position based on angular sector position information from the sensor assembly, with an initial rotor position being used for starting the machine in a brushless direct current mode of operation, the rotor angle processor further including an extrapolator configured to determine rotor angle position based on angular sector position information from the sensor assembly; and a switching module responsive to a switching signal from a mode-crossover controller to pass rotor position from the extrapolator, the rotor position information from the extrapolator being used to provide a sinusoidal mode of operation, in lieu of the brushless direct current mode of operation, upon the mode-crossover controller determining whether a predefined mode-crossover criterion has been reached.

8. The system of claim 7 wherein the mode-crossover criterion is reached when the extrapolated rotor angle position has a sufficiently high level of accuracy to enable the machine to seamlessly transition from the brushless direct current mode of operation to the sinusoidal mode of operation.

9. The system of claim 7 wherein the extrapolating of angular sector position information is performed by the extrapolator by:

determining the angular sector corresponding to a respective sensor state;

determining timing of sensor state transitions; and calculating the present value of extrapolated rotor angle.

10. The system of claim 7 wherein the calculating of the present value of extrapolated rotor angle is based on the following equation:

$$\theta_{EXT}(t) = \theta_{SECTOR\_LAST} + \Delta\theta \frac{t - T_1}{T_1 - T_2},$$

wherein $\theta_{EXT}$ (t) represents the present value for the extrapolated rotor angle, $\theta_{SECTOR\_LAST}$ represents the angle at the last sector transition, $\Delta\theta$ represents the angular resolution provided by the sensor assembly, $T_1$ represents the time at which a last sensor state transition occurred, $T_2$ represents the time at which the previous to the last state transition occurred, and t represents a variable indicative of time.

11. The system of claim 7 wherein the sensor assembly comprises three sensors circumferentially spaced about 120 electrical degrees from one another.

12. The system of claim 7 wherein the sensor assembly is selected from the group comprising Hall-effect, magneto-resistive, and optical sensors.

13. The system of claim 11 wherein the three sensors in the sensor assembly comprise an integrated sensor assembly.

14. A system using a vector controller for controlling a permanent magnet machine, said system comprising:

a sensor assembly for sensing rotor sector position relative to a plurality of angular sectors;

a rotor angle processor including an angular sector assigner configured to assign rotor position based on angular sector position information from the sensor assembly, with an initial rotor position being used for starting the machine in a brushless direct current mode of operation, the rotor angle processor further including an extrapolator configured to determine rotor angle position based on angular sector position information from the sensor assembly; and a switching module responsive to a switching signal from a mode-crossover module to pass rotor position from the extrapolator, the rotor position information being used by the vector controller to provide a sinusoidal mode of operation, in lieu of the brushless direct current mode of operation, upon a mode-crossover controller determining whether a predefined mode-crossover criterion has been reached.

15. A method for controlling a permanent magnet machine using a vector controller, said method comprising:

providing a sensor assembly for sensing rotor sector position relative to a plurality of angular sectors;

operating the vector controller to start the machine in a brushless direct current mode of operation using a calculated initial rotor position based on angular sector position information from the sensor assembly; and upon reaching a predefined mode-crossover criterion, switching the vector controller to a sinusoidal mode of operation using rotor angle position based on extrapolating angular sector position information from the sensor assembly.

* * * * *